United States Patent
Lawrenson et al.

[15] 3,656,927
[45] Apr. 18, 1972

[54] METHOD AND APPARATUS FOR FLOAT GLASS MANUFACTURE

[72] Inventors: Jack Lawrenson; David Jones, both of St. Helens, England

[73] Assignee: Pilkington Brothers Limited, Liverpool, Lancashire, England

[22] Filed: Mar. 17, 1969

[21] Appl. No.: 807,516

[30] Foreign Application Priority Data

Mar. 27, 1968  Great Britain......................14,809/68

[52] U.S. Cl...................................65/99 A, 65/30, 65/182 R
[51] Int. Cl.......................................................C03b 18/00
[58] Field of Search................65/99, 182, 27, 168, 30, 99 A, 65/182 R

[56] References Cited

UNITED STATES PATENTS

| | | | |
|---|---|---|---|
| 3,351,451 | 11/1967 | Barradell-Smith et al. | 65/182 |
| 3,467,508 | 9/1969 | Loukes et al. | 65/99 |
| 3,468,650 | 9/1969 | Boaz | 65/99 |

*Primary Examiner*—S. Leon Bashore
*Assistant Examiner*—Robert L. Lindsay, Jr.
*Attorney*—Morrison, Kennedy & Campbell

[57] ABSTRACT

The surface of glass is modified by migration of an element from a molten electrically conductive body into the glass, and a continuous gaseous flow in the vicinity of the glass surface emerging from contact with the molten body removes harmful vapors originating from the molten body. The gaseous flow is induced by directing a laterally elongated opening toward the glass surface and the molten body, and causing gas to be either sucked into the opening or emitted therefrom to create a gas flow longitudinally of the glass surface.

8 Claims, 6 Drawing Figures

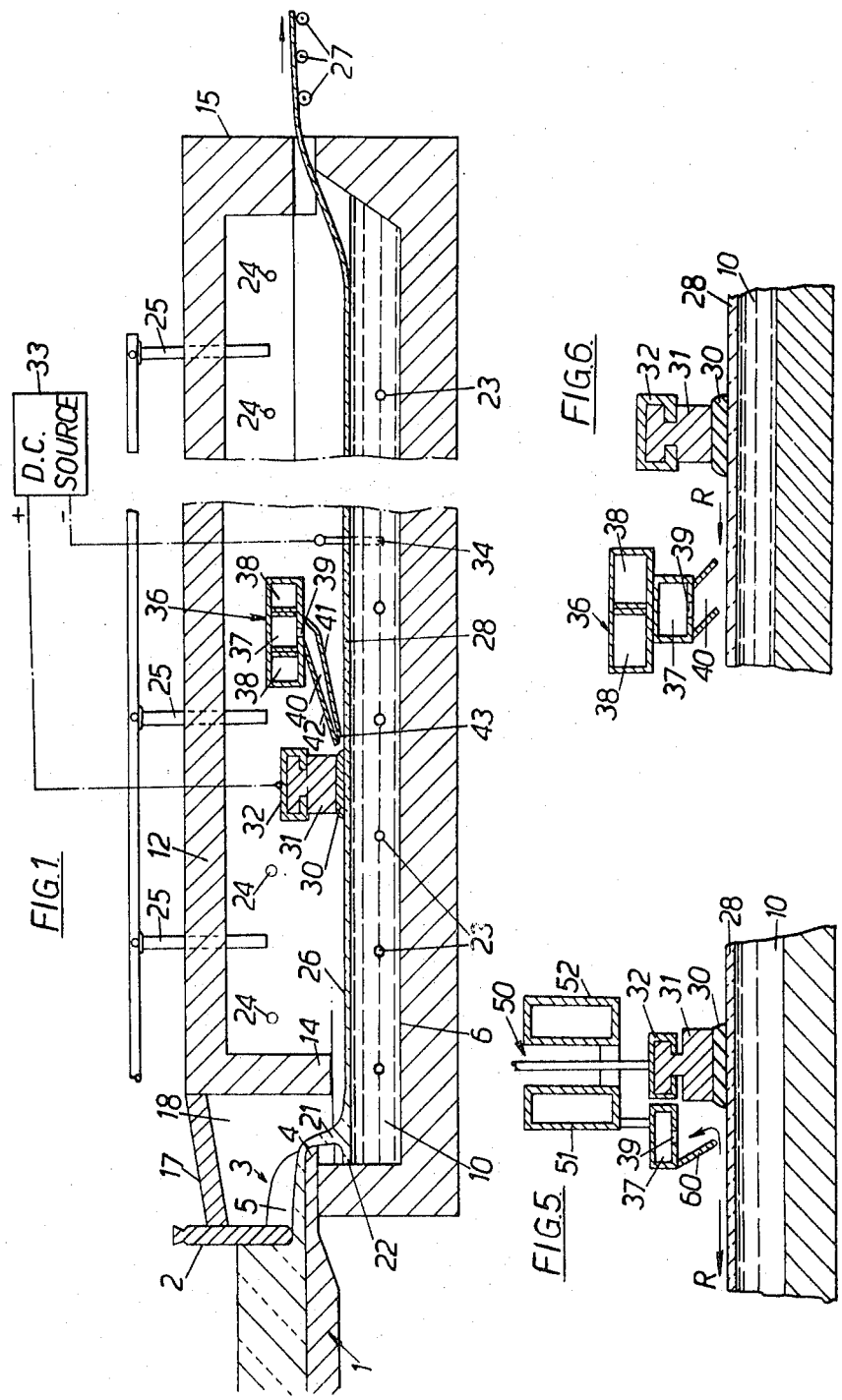

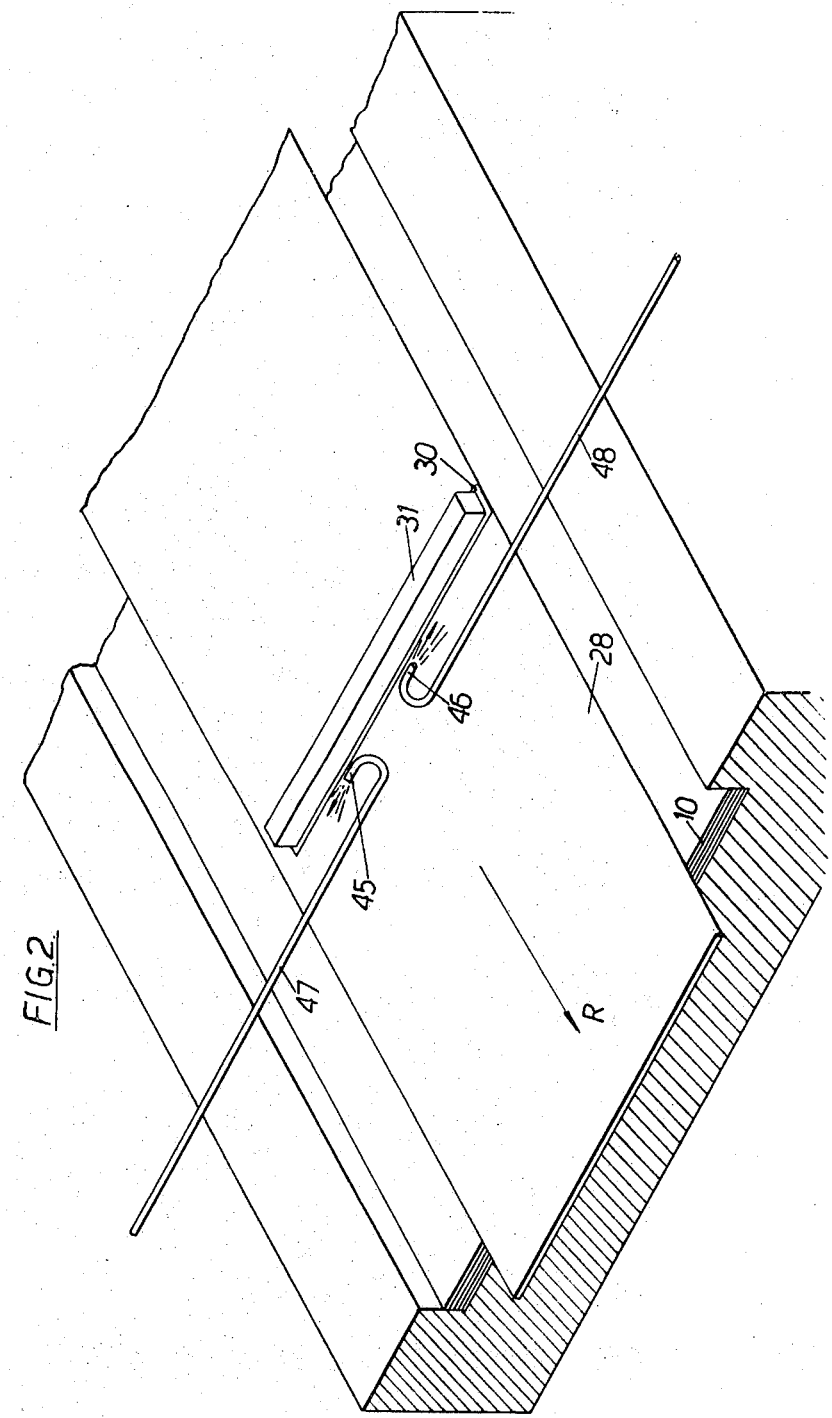

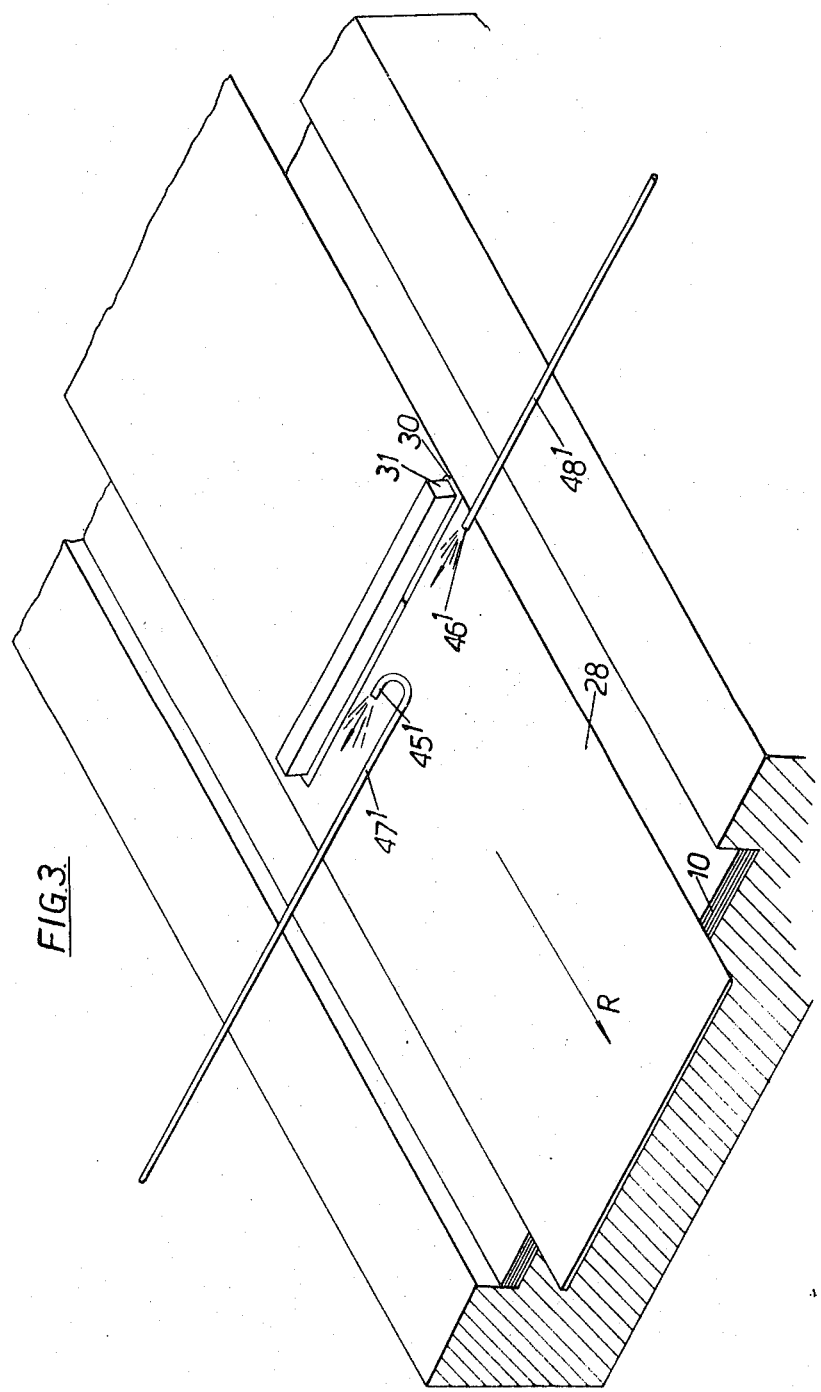

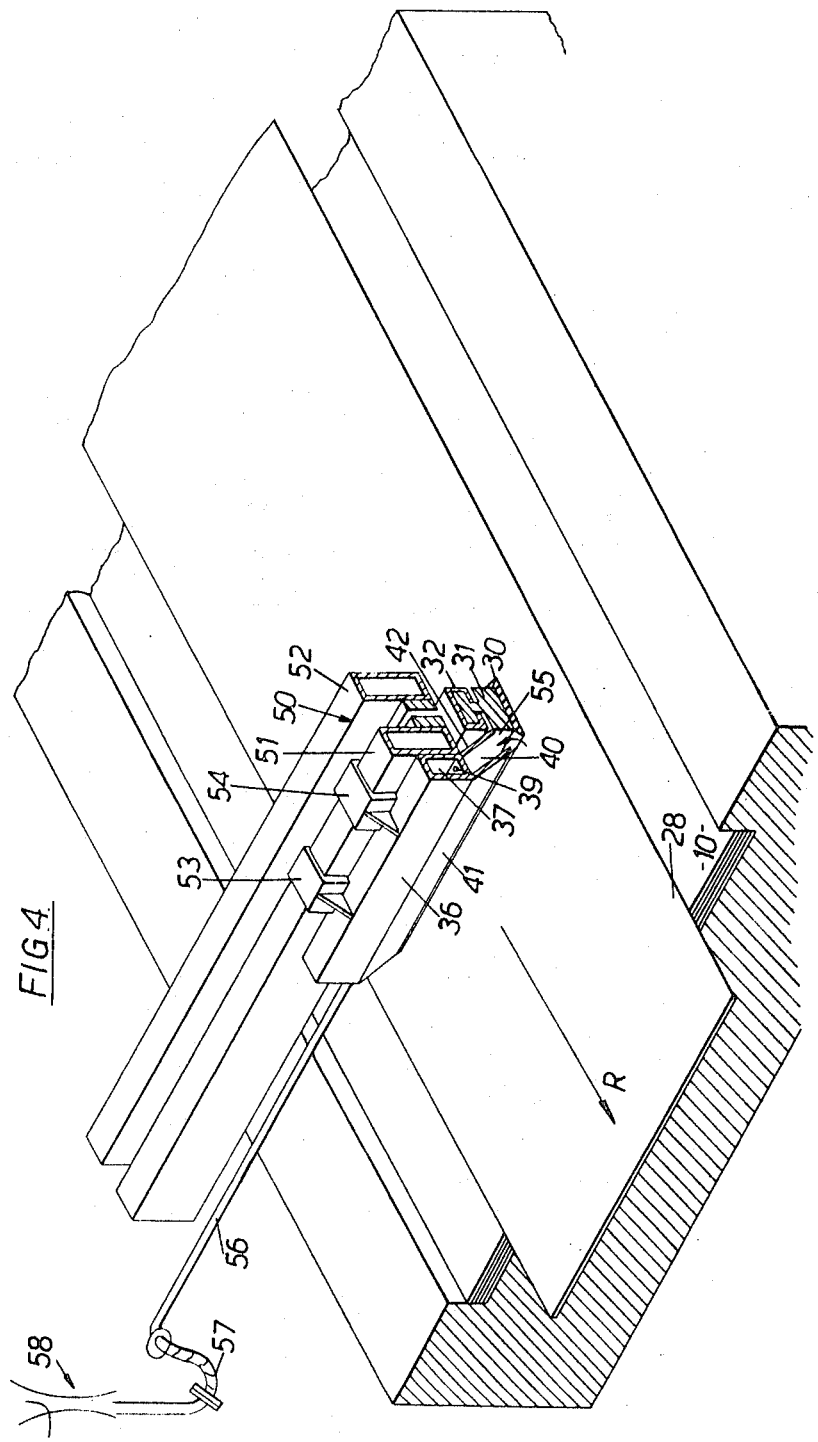

METHOD AND APPARATUS FOR FLOAT GLASS MANUFACTURE

BACKGROUND OF THE INVENTION

This invention concerns improvements in or relating to the production of glass having predetermined surface characteristics.

Methods of producing glass having predetermined surface characteristics other than those inherent in the method of forming the glass are known. In these methods a molten body containing an element capable of producing the required characteristics when incorporated in the glass is maintained in contact with a surface of the glass, under conditions, including, for example, the passage of an electric current into the glass from said body, which cause controlled migration of the said element into the glass, and relative movement is effected between the glass and said body parallel to the surface of the glass to effect treatment of successive surface regions of the glass.

The molten electrically conductive body usually comprises a molten metal, alloy or metal salt. At the elevated temperatures, typically of the order of 740° C., at which the surface treatment of the glass is effected, a quantity of vapor is given off by the molten body. For example, where the body comprises lead or a lead alloy, the emitted vapor may include lead or lead oxide.

Such metallic vapors from the molten body tend to condense on to the surface of the glass emerging from contact with the molten body. The condensation takes place in very fine droplets, which give rise to an undesirable "haze" effect on the glass surface. Moreover, since the glass treatment takes place in a confined space, the continual emission of vapor and its condensation on the walls of the confined space would in the course of time give rise to accretions on these walls; dislodgment of such accretions so that they fall on to the glass surface would also mar the surface of the glass.

An object of the present invention is to avoid such undesirable marring of the glass surface in a method of the above kind by effecting continual removal of vapors originating from the molten body.

SUMMARY

According to the present invention, in a method of producing glass of the kind defined above, a continuous gaseous flow is induced over the vicinity of the glass surface emerging from contact with the molten body, said flow being such as to remove from the vicinity of the said surface substantially all harmful vapors originating from said molten body.

The said gaseous flow may be induced by a suction device which draws gases continuously away from the vicinity of said surface. Alternatively, the said flow may be induced by blowing a gas on to said surface of the glass; to disperse harmful vapors from the vicinity of the downstream edge of the molten body.

The invention also provides apparatus for use in carrying out the said method, comprising means for supporting the glass to be treated, means for effecting said relative movement of the glass, a locating member to which said molten body clings, said locating member extending across said glass surface in a direction transverse to the direction of relative movement of the glass, and means for inducing a gaseous flow over the entire surface of the glass which emerges from contact with the molten body.

The locating member in one embodiment of the invention comprises an electrode structure adapted to be connected to an electrical current source.

Preferably the glass support means comprise a molten metal bath on which the glass floats, said means for effecting relative movement being operative to draw the glass over the surface of the bath beneath said molten body, held at a fixed position by the locating member.

The gaseous flow inducing means may comprise one or more nozzles located in a fixed position relative to the locating member and adapted to direct a gaseous flow over the glass surface in a direction transverse to the direction of relative movement of the glass, on the side of the molten body from which the treated glass emerges. Alternatively, the flow inducing means may comprise a hollow beam structure extending across the glass surface parallel to the locating member and on the side thereof from which the treated glass emerges, said beam structure including a manifold communicating with an elongated outlet or outlets extending along the beam structure and directed towards the glass surface and towards the molten body, said manifold communicating with a source of compressed gas. In a further alternative embodiment of the invention the flow inducing means comprise a hollow beam structure extending across the glass surface parallel to the locating member and on the side thereof from which the treated glass emerges, said beam structure including a manifold communicating with an elongated inlet or a plurality of spaced apart inlets, extending along the beam structure and directed towards the glass and towards the molten body, and a suction pump connected to the manifold to withdraw gas continuously from the vicinity of the glass surface through said inlet or inlets.

Said beam structure may have at least one coolant channel extending therethrough, means being provided for passing a coolant liquid, conveniently water, through said channel. Alternatively, the locating member may be supported by a hollow support member having at least one liquid coolant channel extending therethrough, the said beam structure being arranged in heat-exchange contact with the said hollow support member.

BRIEF DESCRIPTION OF THE DRAWINGS

FIG. 1 is a sectional elevation of apparatus for producing flat glass having predetermined surface characteristics, and incorporating the present invention, FIG. 2 is a diagrammatic perspective view of part of the apparatus of FIG. 1, incorporating a modification of the invention in which a lateral gaseous flow in induced, FIG. 3 is a diagrammatic perspective view corresponding to that of FIG. 2 in which an alternative method of inducing a lateral gaseous flow is employed, FIG. 4 is a diagrammatic perspective view, corresponding to that of FIG. 2, illustrating an alternative embodiment of the invention in which gases are withdrawn from the vicinity of the glass surface, FIGS. 5 and 6 are cross-sectional views of further alternative embodiments in which gases are withdrawn from the vicinity of the glass surface.

In the drawings like references indicate the same or corresponding parts.

DESCRIPTION OF THE PREFERRED EMBODIMENTS

Referring to FIG. 1 of the drawings, a forehearth of a continuous glass melting furnace is indicated at 1 and a regulating tweel at 2. The forehearth 1 ends in a spout 3 comprising a lip 4 and side jambs 5, one of which is shown in FIG. 1. The lip 4 and side jambs 5 together constitute a spout of generally rectangular cross-section.

The spout 3 is disposed above the floor 6 of an elongated tank structure holding a bath 10 of molten metal. The bath 10 is, for example, molten tin, or tin alloy in which tin predominates and which has a specific gravity greater than that of glass.

A roof structure 12 having integral end walls 14, 15 is supported over the tank structure and defines a headspace 16 above the surface of the bath 10, the end walls 14, 15 define inlet and outlet openings respectively at opposite ends of the bath. An extension 17 of the roof structure 12 extends to the tweel 2 and forms a chamber with side walls 18 in which chamber the spout 3 is disposed.

Molten soda/lime/silica glass 21 is poured on to the bath 10 from the spout 3 and the tweel 2 regulates the rate of glass flow over the lip 4. The spout 3 is spaced above the surface of the bath 10 so that the molten glass has a free fall of a few inches, exaggerated in FIG. 1, to the bath surface. This free fall is such as to ensure the formation of a heel 22 of molten glass behind the glass 21 pouring over the spout 3, which heel 22 extends up to the inlet end wall of the tank structure.

The temperature of the glass as it is advanced along the bath 10 is regulated by thermal regulators 23 immersed in the bath 10, and further thermal regulators 24 disposed in the headspace 16. A protective gas, for example, nitrogen, is supplied to the headspace 16 through ducts 25. Thus a plenum of protective gas is maintained in the headspace, an outward flow of gas occurring through the inlet and outlet ends of the headspace.

The temperature of the molten glass is regulated by the regulators 23, 24 as the glass is advanced along the surface of the bath so as to ensure that a layer 26 of molten glass is established on the bath. This layer is drawn through the outlet end of the tank structure by driven conveyor rollers 27 mounted externally of the said outlet end. As the layer 26 advances along the bath unhindered lateral flow of the glass takes place under the influence of gravity to form a ribbon 28 of uniform width, less than the width of the bath 10. The equilibrium limit set to the unhindered lateral flow is determined by the surface tension and viscosity of the glass.

The present invention is concerned with surface treatment of the glass ribbon 28 as it is advanced over the surface of the bath in order to impart surface characteristics to the glass other than those inherent in the method of forming the glass. At a region of the bath 10 where the glass has a predetermined temperature, for example, 750°–800° C., such that the glass is electrically conductive, a body 30 of molten electrically conductive material, for example, molten metal, is maintained in contact with the upper surface of the glass.

The body 30 extends transversely across the glass ribbon 28 at a fixed position in the bath. The body is maintained in position by clinging to a surface of a locating member comprising an electrode bar 31 supported from an elongated holder 32 extending horizontally above the bath 10 and transversely of the ribbon 28. The body 30 consists of or includes an element which, when incorporated in the glass, imparts the required surface characteristic thereto. Controlled migration of the element into the surface of the glass is effected electrolytically by passing an electric current from the body 30 into the glass.

Conveniently, the electrolytic current is established by connecting the body 30 and the molten metal bath 10 to positive and negative terminals respectively of a direct current source, indicated diagrammatically at 33. Electrical connection is made to the bath 10 by an electrode 34 dipping into the bath at one side thereof while the electrode bar 31 constitutes an effective anode. The direct current source 33 includes means (not shown) for regulating the current.

The molten body 30 may comprise a metal, for example, tin, lead, bismuth, antimony, indium, zinc or thallium, or may comprise an alloy, for example, alloys in which tin, bismuth or lead predominates. The choice of material for the body 30 is determined by the nature of the surface characteristic which it is desired to impart to the glass. A glass surface which has been treated with tin may have good heat reflecting and light transmitting properties and is not easily wetted by water. Alloys based on bismuth or lead can be employed for coloring or tinting the glass surface: for example, a silver-bismuth alloy results in a yellow coloration; nickel-bismuth alloy in a grey coloration; a copper-bismuth or copper-lead alloy in a red coloration. The body may alternatively comprise a molten salt: for example silver may be caused to migrate into the glass by maintaining a body 30 of molten silver chloride in contact with the glass surface.

In carrying out the surface modification process a vapor is given off on the downstream side of the body 30. The quantity of vapor given off varies for different molten bodies, and is particularly noticeable when using a body 30 of lead or a lead alloy, especially lead-copper alloy. In this case it is thought that the vapor comprises lead or lead oxide.

To prevent possible condensation of this vapor on the treated glass surface downstream of the body 30, the vapor is removed continuously from the vicinity of the glass surface as the latter emerges from beneath the body 30.

In the embodiment illustrated in FIG. 1 vapor removal is accomplished by directing a stream of protective gas on to the glass surface immediately downstream of the body 30 to disperse the metal vapor and blow it away from the said surface. For this purpose a hollow beam structure 36 extends transversely across the tank structure above the bath 10 and parallel to the electrode bar 31. The beam structure 36 is shown in section FIG. 1 and is provided with a central manifold 37 and, on each side of the manifold 37, two cooling water channels 38. The lower wall of the manifold 37, facing the glass ribbon 28, is provided with a plurality of spaced apart holes 39 which provide communication between the manifold 37 and a laterally elongated chute 40 defined between two inclined convergent walls 41, 42. The chute 40 terminates in an elongated outlet 43 extending parallel to the surface of the glass ribbon 28 and to the electrode bar 31. The chute 40 is directed towards the glass surface and towards the molten body 30. The protective gas (e.g., nitrogen) is supplied to the manifold 37 from any convenient compressor (not shown) and delivered to the glass surface at a rate typically between several hundred and several thousand cubic feet per hour.

Instead of directing the gas towards the molten body 30, the gas may be directed laterally across the surface of the glass to effect vapor dispersal. Two alternative arrangements for doing this are illustrated, purely diagrammatically, in FIGS. 2 and 3. In FIG. 2 the hollow beam structure is replaced by two nozzles 45, 46 positioned close to the glass surface immediately downstream of the molten body 30, and close to the longitudinal center-line of the glass ribbon. The nozzles 45, 46 are directed transversely of the ribbon 28 towards opposite respective edges thereof. Respective lines 47, 48 communicating with a blower (not shown) supply the protective gas under pressure to the respective nozzles 45, 46 to induce a gaseous transverse flow over the ribbon 28 towards the edges of the bath 10.

In FIG. 3 an arrangement similar in principle to that of FIG. 2 is shown. Two laterally directed nozzles 45', 46' are supplied with compressed protective gas through respective lines 47', 48', but in this embodiment both nozzles 45', 46' face in the same direction, towards a common edge of the ribbon 28, the nozzle 45' being located near the center-line of the ribbon 28 and the nozzle 46' being located near the other edge of the ribbon. In both FIGS. 2 and 3 the direction of ribbon travel is indicated by an arrow R.

The embodiments hitherto described rely on blowing. An alternative method of removing the vapor from the vicinity of the glass surface is to extract the vapor by suction. Three embodiments operating on this principle are illustrated in FIGS. 4, 5 and 6.

Referring to FIG. 4, the electrode holder 32 is suspended from a supporting beam 50 by adjustable means (not shown), the beam 50 comprising two parallel box-section members 51, 52 supported at the sides of the tank structure by adjustable support pillars (not shown). Cooling water is passed through the interior of each box-section member. A hollow beam structure 36 is carried by the box-section member 51 on the downstream side of the beam 50, the beam structure 36 being attached to the member 51 by hook elements 53, 54. The beam structure 36 is provided with an interior manifold 37 the base of which is provided with a plurality of holes 39 spaced apart along the length of the beam structure 36 and communicating with a chute 40 defined between two parallel inclined walls 41, 42. The chute is inclined towards the glass surface and towards the molten body 30, that is, it is inclined downwardly in an upstream direction. The chute 40 terminates in a laterally elongated inlet slot 55 closely adjacent the surface of the glass.

The manifold 37 is connected at each end to a suction line 56 which includes an electrically insulating bellows section 57 and which is connected to the inlet of an ejector pump, shown diagrammatically at 58. The protective atmosphere containing the unwanted vapor in the vicinity of the glass surface on the downstream side of the molten body 30 is withdrawn through the slot 55 by the action of the ejector pump 58. Typically the ejector pump 58 is capable of extracting several thousand cubic feet of the vapor-containing atmosphere per hour. The beam structure 36 is cooled by heat exchange between the contacting walls of the beam structure 36 and the box-section member 51 to which it is attached.

In FIG. 5 a modification of the arrangement of FIG. 4 is shown in which the suction manifold 37 is suspended beneath the downstream box-section member 51, and effectively forms part of the support beam 50. In this modification the chute 40 is dispensed with and the holes 39 in the base of the manifold 37 communicate directly with the space above the surface of the glass ribbon 28 immediately downstream of the molten body 30. A baffle member 60 extends downwardly and in an upstream direction to within a short distance of the surface of the ribbon 28 to partially confine the space from which has and vapor is withdrawn.

When a high rate of vapor withdrawal takes place close to the site of surface modification, as in the embodiments of FIGS. 4 and 5, there is a tendency in some cases for the uniformity of the surface treatment of the glass to be adversely affected. To minimize this adverse effect when employing a high rate of vapor extraction the inlet or inlets for the withdrawal of vapor may be spaced a short distance, for example, 3 inches, downstream of the molten body and electrode assembly.

Referring to FIG. 6 a beam structure 36 having an internal suction manifold 37 is supported downstream of, and independently of, the beam 50 supporting the electrode bar 31. The beam structure 36 also has water coolant channels 38 passing therethrough. Holes 39 in the base of the manifold 37 communicate with a chute 40 in a similar manner to the embodiment of FIG. 4. The chute 40 terminates close to the surface of the glass ribbon 28 at a distance of the order to 3 inches from the downstream side of the molten body 30.

It will be appreciated that, although the invention has been illustrated in its application to the treatment of flat glass, specifically where the glass is supported horizontally, the invention is applicable to the treatment of glass surfaces generally by contact with molten electrically conductive bodies accompanied by current flow. Thus the invention could equally well be applied to remove unwanted vapor during surface treatment of articles of glass or surface treatment of glass sheets in, for example, a vertical orientation.

Moreover, the invention is also applicable to the removal of unwanted vapor arising in treatments of glass surfaces by molten bodies other than the electrolytic treatment specifically described, for example, treatment by contact with molten bodies under controlled oxidizing conditions.

We claim:

1. Float glass manufacturing apparatus comprising a tank structure containing a bath of molten metal, means for delivering glass to the bath and advancing the glass in ribbon form along the bath, a locating member extending across the tank structure just above the bath surface for locating on the upper surface of the ribbon a molten electrically conductive body containing a glass surface modifying element, and gas flow inducing means positioned in the tank structure above the bath surface just downstream of said locating member for inducing a gaseous flow over the entire modified surface of the glass as it emerges from beneath the molten body, said gas flow inducing means comprising a hollow beam structure extending across the glass surface parallel to the locating member and on the side thereof from which the treated glass emerges, said beam structure including a suction manifold having an elongated gas inlet means extending along the beam structure, said inlet means being directed towards the molten body and towards the glass surface, and a suction pump connected to the manifold to withdraw gas continuously from an atmosphere in the vicinity of the glass surface through said inlet means.

2. Apparatus according to claim 1, wherein the beam structure has at least one coolant channel extending therethrough, means being provided for passing a coolant liquid through said channel.

3. Apparatus according to claim 1, wherein the locating member is supported by a hollow support member having at least one liquid coolant channel extending therethrough, the said beam structure being arranged in heat exchange contact with the said hollow support member.

4. A method of producing float glass having predetermined surface characteristics, comprising advancing a ribbon of glass along a molten metal bath, maintaining in contact with the upper surface of the advancing ribbon a molten electrically conductive body containing an element for producing the required surface characteristics when incorporated in the glass, causing controlled migration of the said element from the body into the glass which results in harmful vapours occurring above the glass, and inducing a continuous gaseous flow over the lateral width of said ribbon in the vicinity of the downstream edge of the molten body in a direction longitudinally of the ribbon, over the entire width of the ribbon, said flow being at a rate sufficient to remove from the vicinity of the ribbon surface emerging from beneath said molten body harmful vapours originating from the said molten body.

5. A method of producing float glass having predetermined surface characteristics, comprising advancing a ribbon of glass along a molten metal bath, maintaining in contact with the upper surface of the advancing ribbon a molten electrically conductive body containing an element for producing the required surface characteristics when incorporated in the glass, causing controlled migration of said element from the body into the glass which results in harmful vapours occurring above the glass, and applying suction over the whole lateral width of said ribbon in the vicinity of the downstream edge of the molten body to cause continuous gaseous flow over the ribbon in said vicinity in a direction longitudinally of the ribbon and over the entire lateral width of the ribbon, said flow being at a rate sufficient to remove from the vicinity of the ribbon surface emerging from beneath said molten body harmful vapours originating from said molten body.

6. A method according to claim 4 wherein said step of inducing said continuous gaseous flow comprises blowing protective gas onto said ribbon surface towards the downstream edge of the molten body along the lateral width of the molten body.

7. Float glass manufacturing apparatus comprising a tank structure containing a bath of molten metal, means for delivering glass to the bath and advancing the glass in ribbon form along the bath, a locating member extending across the tank structure just above the bath surface for locating on the upper surface of the ribbon a molten electrically conductive body containing a glass surface modifying element, and gas flow inducing means positioned in the tank structure above the bath surface just downstream of said locating member for inducing a gaseous flow over the entire lateral modified surface of the glass as it emerges from beneath the molten body, said gas flow inducing means comprising: a hollow beam structure extending across the glass surface parallel to the locating member and on the side thereof from which the treated glass emerges, a manifold for gas flow embodied in the beam structure, elongated opening means communicating with said manifold and extending along the beam structure, said opening means being directed towards the molten body and towards the glass surface in the vicinity of the downstream edge of said molten body, and means connected to said manifold to induce continuous gaseous flow through said opening and longitudinally of the ribbon across the lateral width of said ribbon in said vicinity for continuously removing from said vicinity harmful vapours originating from said molten body.

8. Apparatus according to claim 7 wherein said means connected to said manifold to induce continuous gaseous flow through said opening comprises means for supplying compressed protective gas through said opening and towards said vicinity to disperse away from the ribbon surface harmful vapours originating from said molten body.

* * * * *